US010933841B2

(12) United States Patent
Kominato et al.

(10) Patent No.: US 10,933,841 B2
(45) Date of Patent: Mar. 2, 2021

(54) DETECTION SYSTEM FOR VEHICLE (71) Applicant: Yazaki Corporation, Tokyo (JP)

(72) Inventors: Yasuhiro Kominato, Shizuoka (JP);
Goro Nakamura, Shizuoka (JP);
Tadahide Kunitachi, Kanagawa (JP);
Kenji Matsushita, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/374,690

(22) Filed: Apr. 3, 2019

(65) Prior Publication Data
US 2019/0308586 A1 Oct. 10, 2019

(30) Foreign Application Priority Data

Apr. 9, 2018 (JP) .............................. JP2018-074593

(51) Int. Cl.
B60R 22/48 (2006.01)
B60N 2/00 (2006.01)
B60Q 9/00 (2006.01)
B60R 16/03 (2006.01)
B60R 21/015 (2006.01)
B60R 21/01 (2006.01)

(52) U.S. Cl.
CPC .............. B60R 22/48 (2013.01); B60N 2/002 (2013.01); B60Q 9/00 (2013.01); B60R 16/03 (2013.01); B60R 21/01512 (2014.10); B60R 21/01546 (2014.10); B60R 2021/01088 (2013.01); B60R 2022/4808 (2013.01); B60R 2022/4816 (2013.01); B60R 2022/4866 (2013.01)

(58) Field of Classification Search
CPC .............. B60N 2/002; B60R 21/01512; B60R 21/01516; B60R 21/01534; B60R 21/01546; B60R 21/015; B60R 2021/01088; B60R 2022/4816; B60R 2022/4858; B60R 22/48; B60R 16/03; B60Q 9/00; G01S 13/04; G06K 19/0723; H01Q 7/00
USPC ...... 340/457.1, 539.1, 573.1, 687, 457, 667, 340/571; 701/1, 301
See application file for complete search history.

(56) References Cited

U.S. PATENT DOCUMENTS 9,486,160 B2 * 11/2016 Russell ................ A61B 5/1036
2006/0283651 A1 * 12/2006 Fultz .................... B60W 40/08
180/272

(Continued)

FOREIGN PATENT DOCUMENTS

JP 2015-20447 A 2/2015

Primary Examiner — Hung T Nguyen
(74) Attorney, Agent, or Firm — Kenealy Vaidya LLP (57) ABSTRACT A detection system for vehicle includes a reader and a first detector. The reader is provided in a vehicle, transmits and receives radio signals, and transmits transmission signals including at least radio signals for supplying electric power. The first detector is driven by the radio signals for supplying electric power included in the transmission signals when receiving the transmission signals and can transmit first response signals output in response to the transmission signals to the reader. The first detector is disposed in a sitting area on a seat where the first response signals transmitted to the reader are blocked. The reader determines a sitting state of a passenger based on whether the first response signals are received in response to the transmission signals.

5 Claims, 9 Drawing Sheets (56) References Cited

U.S. PATENT DOCUMENTS

| | | | |
|---|---|---|---|
| 2011/0074567 A1* | 3/2011 | Miyamori | B60N 2/002 340/457.1 |
| 2015/0145666 A1* | 5/2015 | Sugawara | B60R 22/48 340/457.1 |
| 2015/0329033 A1* | 11/2015 | Michalak | B29C 44/1271 297/217.1 |
| 2018/0072255 A1* | 3/2018 | Foltin | B60R 21/01548 |
| 2019/0103651 A1* | 4/2019 | Yanagida | B60R 16/0232 |
| 2019/0184853 A1* | 6/2019 | Thomas | B60R 22/48 |

\* cited by examiner

| SEAT POSITION | ARRANGE-MENT POSITION | DETECTOR ID | | ON/OFF |
|---|---|---|---|---|
| | | 52 | 53 | |
| FR | S | 0001 | 0000···0001 | ON |
| | T | 0001 | 0000···0010 | ON |
| | U | 0001 | 0000···0011 | ON |
| | V | 0001 | 0000···0100 | ON |
| | W | 0001 | 0000···0101 | ON |
| | X | 0001 | 0000···0110 | ON |
| | Y | 0001 | 0000···0111 | ON |
| | Z | 0001 | 0000···1000 | ON |
| | Ba | 0001 | 0000···1111 | ON |
| FL | S | 0002 | 0000···0001 | OFF |
| | T | 0002 | 0000···0010 | OFF |
| | U | 0002 | 0000···0011 | OFF |
| | V | 0002 | 0000···0100 | OFF |
| | W | 0002 | 0000···0101 | OFF |
| | X | 0002 | 0000···0110 | OFF |
| | Y | 0002 | 0000···0111 | OFF |
| | Z | 0002 | 0000···1000 | OFF |
| | Ba | 0002 | 0000···1111 | OFF |
| | ... | ... | ... | ... |

DETECTION SYSTEM FOR VEHICLE

CROSS-REFERENCE TO RELATED APPLICATION(S)

The present application claims priority to and incorporates by reference the entire contents of Japanese Patent Application No. 2018-074593 filed in Japan on Apr. 9, 2018.

BACKGROUND OF THE INVENTION

1. Field of the Invention

The present invention relates to a detection system for vehicle.

2. Description of the Related Art

Conventionally developed are detection systems for vehicle that detect a sitting state on a seat and a seat belt wearing state of a passenger and warn the passenger based on the detection results. Detection systems for vehicle include sitting sensors disposed in the seat surfaces of respective seats to detect the sitting state of a passenger, for example. The sitting sensors are connected to a battery or the like via a wire harness extending under a floor, for example. This configuration requires sub-harnesses connecting the sitting sensors of the respective seats to the wire harness, resulting in increased cost and weight. To address this, there have been developed membrane switches including a sitting sensor and a communication device that supplies electricity to the sitting sensor by a communication technique, such as radio frequency identifier (RFID) (e.g., refer to Japanese Patent Application Laid-open No. 2015-20447).

In the conventional detection systems for vehicle, however, a passenger sitting on the seat may possibly serve as an obstacle and prevent detection signals transmitted from the sitting sensor from reaching the communication device. As a result, the communication device may possibly erroneously detect whether a passenger is sitting on the seat. Consequently, the conventional detection systems for vehicle still have room for improvement.

SUMMARY OF THE INVENTION

In view of the disadvantages described above, the present invention aims to provide a detection system for vehicle that can determine a sitting state of a passenger with higher accuracy.

In order to achieve the above mentioned object, a detection system for vehicle according to one aspect of the present invention includes a reader provided in a vehicle and configured to transmit and receive a radio signal and to transmit a transmission signal including at least a radio signal for supplying electric power; and a first detector driven by the radio signal for supplying electric power included in the transmission signal when receiving the transmission signal and capable of transmitting a first response signal output in response to the transmission signal to the reader, wherein the first detector (20A) is disposed in a sitting area on a seat where the first response signal transmitted to the reader is blocked, and the reader determines a sitting state of a passenger based on whether the first response signal is received in response to the transmission signal.

According to another aspect of the present invention, in the detection system for vehicle, it is possible to configure that the seat includes at least a seat surface and a backrest, at least one first detector is disposed in each of the sitting areas of the seat surface and the backrest, a plurality of the first detectors each has unique first identification information and transmits the first identification information to the reader as the first response signal, and the reader determines, when receiving the first identification information from the first detector disposed in the seat surface, an attribute of the passenger based on whether the first identification information is received from the first detector disposed in a height direction of the backrest.

According to still another aspect of the present invention, in the detection system for vehicle, it is possible to configure that the reader identifies arrangement positions of the first detectors based on the first identification information received from the respective first detectors and determines the sitting state of the passenger based on number of the arrangement positions.

According to still another aspect of the present invention, in the detection system for vehicle, it is possible to further include that a second detector driven by the radio signal for supplying electric power included in the transmission signal and detects a seat belt wearing state of the seat, wherein the second detector includes a switching circuit configured to switch to an ON state or an OFF state based on the seat belt wearing state of the seat, the second detector transmits a second response signal to the reader depending on the ON state or the OFF state of the switching circuit, the reader determines the sitting state of the passenger on the seat based on the first response signal, determines the seat belt wearing state based on the second response signal, and outputs, when the passenger is in the sitting state and does not wear the seat belt, a warning signal to a notifying unit, and the notifying unit warns the passenger based on the warning signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A detection system for vehicle according to the present invention is described below in greater detail with reference to the accompanying drawings. The embodiment below is not intended to limit the present invention. Components in the embodiment include components easily conceivable by those skilled in the art and components substantially identical therewith. Various omissions, substitutions, and changes in the components in the embodiment may be made without departing from the spirit of the invention.

Embodiment

Figure 2:
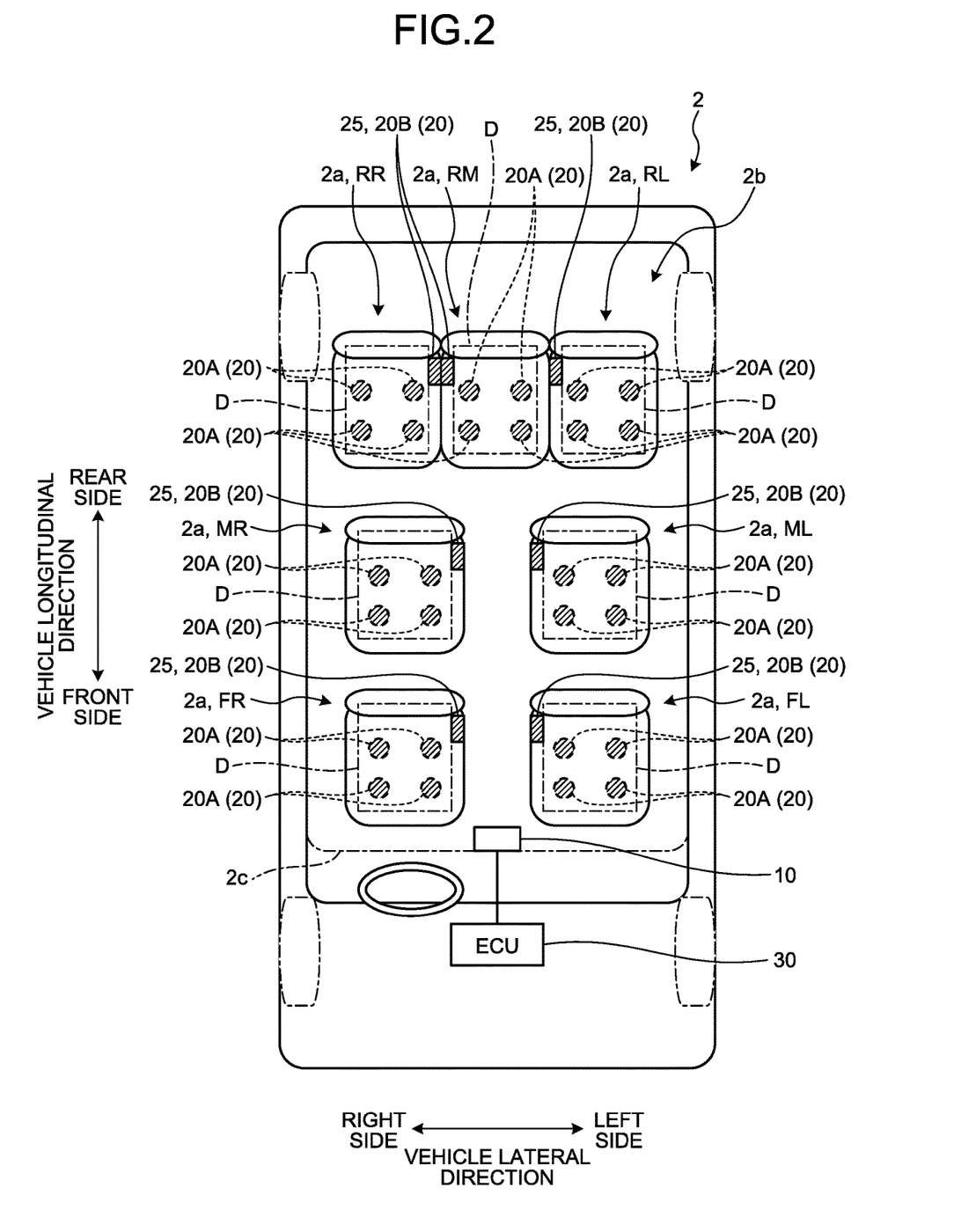
FIG. 2 is a schematic of exemplary arrangement of the detection system for vehicle according to the embodiment.
Figure 3:
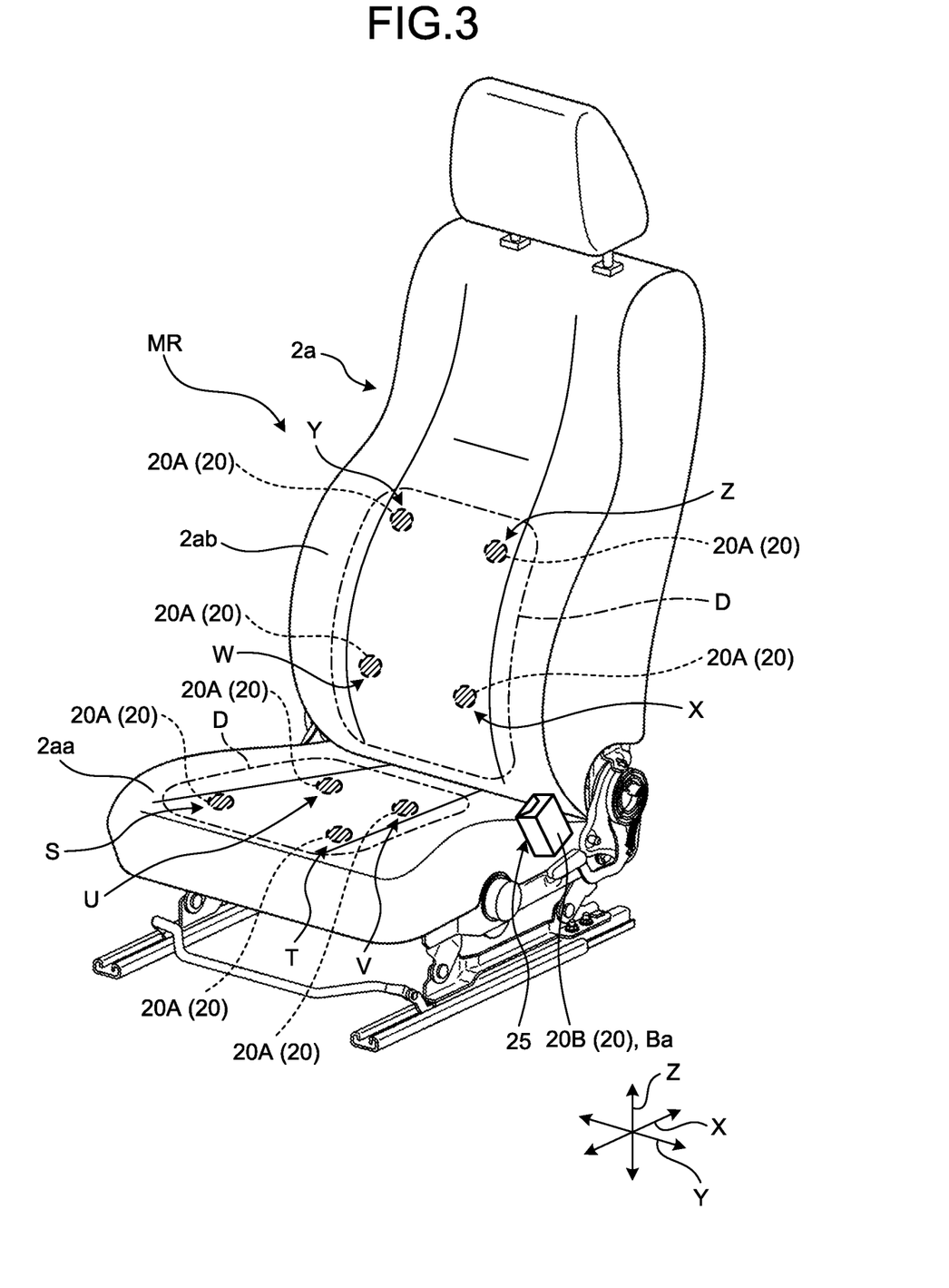
FIG. 3 is a schematic of exemplary arrangement of detectors in the embodiment.

A detection system for vehicle 1 is provided in a vehicle 2, such as a car, illustrated in FIG. 2. The vehicle 2 includes a plurality of seats 2a arrayed in three rows in the longitudinal direction and two or three rows in the lateral direction in a cabin 2b, for example. As illustrated in FIG. 3, for example, the seats 2a each include at least a seat surface 2aa and a backrest 2ab. The seat surface 2aa is provided with a buckle 25 to which a tongue plate of a seat belt, which is not illustrated, is fastened. As illustrated in FIG. 3, the seats 2a each have sitting areas D coming into contact with at least a sitting passenger. The sitting areas D are provided on the seat surface 2aa and the backrest 2ab. The sitting areas D are set corresponding to various passengers having different heights, weights, shapes, and the like depending on the shapes of the seat surface 2aa and the backrest 2ab. The detection system for vehicle 1 determines a sitting state on each of the seats 2a and a seat belt wearing state of a passenger. If a passenger is in the sitting state and does not wear the seat belt, the detection system for vehicle 1 notifies the passenger by issuing a warning, for example. The detection system for vehicle 1 according to the present embodiment includes a reader 10 and a plurality of detectors 20.

In the following description, as illustrated in FIG. 2, a vehicle longitudinal direction in the vehicle 2 corresponds to the overall length direction of the vehicle 2. In the vehicle longitudinal direction, the side to which the vehicle 2 moves forward may be referred to as a front side, and the side to which the vehicle 2 moves rearward may be referred to as a rear side. A vehicle lateral direction corresponds to the overall width direction of the vehicle 2. In the vehicle lateral direction, the left side when facing the front side in the vehicle longitudinal direction may possibly be referred to as a left side, and the right side when facing the front side in the vehicle longitudinal direction may possibly be referred to as a right side. The vehicle longitudinal direction and the vehicle lateral direction are orthogonal to each other. The vehicle longitudinal direction and the vehicle lateral direction extend along the horizontal direction when the vehicle 2 is positioned on a horizontal plane. In FIGS. 3 and 6 to 9, an X-direction, a Y-direction, and a Z-direction intersect with one another. The X-direction corresponds to a "depth direction", the Y-direction corresponds to a "width direction", and the Z-direction corresponds to an "up-and-down direction". The Z-direction is not necessarily identical with the vertical direction.

Figure 1:
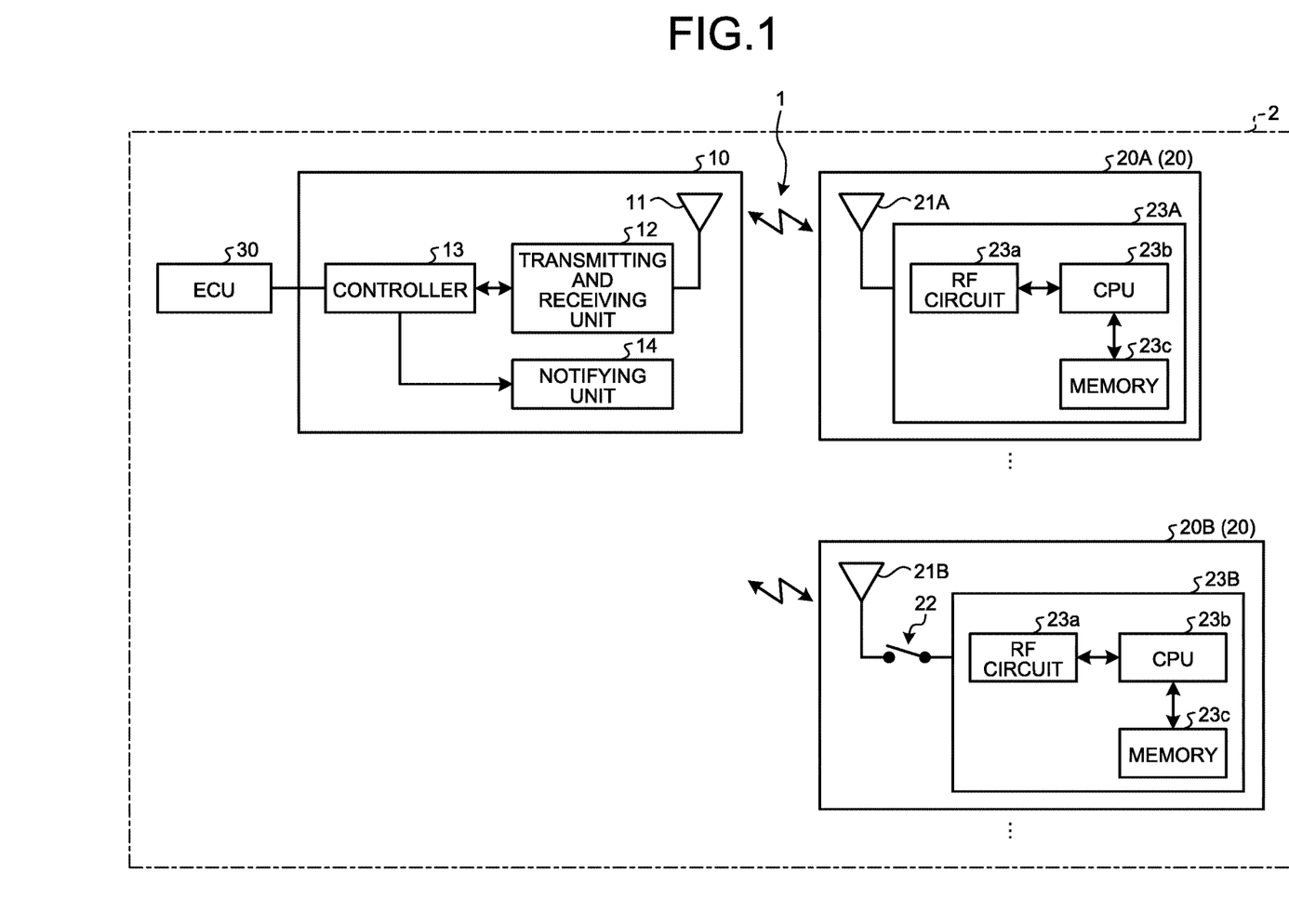
FIG. 1 is a block diagram of an exemplary configuration of a detection system for vehicle according to an embodiment.

The reader 10 is provided in the vehicle 2. As illustrated in FIG. 2, for example, the reader 10 is disposed at the end on the vehicle front side on an inner roof 2c in the cabin 2b. The reader 10 is not necessarily disposed at the end on the vehicle front side on the inner roof 2c and may be disposed on an instrument panel (not illustrated) or at the center of the inner roof 2c. The reader 10 is a communication device that performs near-field communications using a communication technique, such as RFID, with the detectors 20. The reader 10 is compatible with passive RFID, for example. The reader 10 transmits transmission signals (carrier waves) to supply electric power to the detectors 20 and receives response signals (subcarrier waves) output in response to the transmission signals from the detectors 20. The reader 10 periodically transmits the transmission signals in the cabin 2b. The reader 10 receives the response signals from the detectors 20 in response to the transmission signals. The reader 10 is electrically connected to an electronic control unit (ECU) 30 that controls the whole vehicle 2. The reader 10 can acquire ON/OFF information on an accessory (ACC) power source or an ignition (IG) power source from the ECU 30. As illustrated in FIG. 1, the reader 10 includes a first antenna 11, a transmitting and receiving unit 12, a controller 13, and a notifying unit 14.

The first antenna 11 transmits and receives radio signals (radio waves) by a radio-wave system using high-frequency waves, such as the UHF band and microwaves. The first antenna 11 is electrically connected to the transmitting and receiving unit 12. The first antenna 11 transmits transmission signals including radio signals for supplying electric power and carrier waves output from the transmitting and receiving unit 12 to the detectors 20. The transmission signals may include control signals and other signals to be transmitted to the detectors 20 besides the radio signals for supplying electric power. The first antenna 11 receives response signals transmitted from the detectors 20 and outputs them to the transmitting and receiving unit 12. The response signals are radio signals including identification information allocated to the respective detectors 20. The identification information is what is called tag ID and is unique ID varying depending on the detectors 20. The unique ID is expressed by a 64-bit character string, for example.

The transmitting and receiving unit 12 is electrically connected to the first antenna 11 and transmits and receives radio signals via the first antenna 11. The transmitting and receiving unit 12, for example, transmits the transmission signals described above to the first antenna 11. The transmitting and receiving unit 12 receives the response signals transmitted from the detectors 20 via the first antenna 11. The transmitting and receiving unit 12 demodulates the received response signals and outputs them to the controller 13.

The controller 13 is electrically connected to the transmitting and receiving unit 12 and the notifying unit 14 and controls them. The controller 13, for example, includes an electronic circuit mainly provided by a known micro-computer including a central processing unit (CPU), a read only memory (ROM), a random access memory (RAM), and an interface. The controller 13, for example, controls the transmitting and receiving unit 12 to transmit the transmission signals to the detectors 20 at predetermined intervals (e.g., at one-second intervals). The controller 13 determines the sitting state on each of the seat 2a and the seat belt wearing state of a passenger based on whether the response signals are received from the corresponding detector 20 in response to the transmission signals. If a passenger is in the sitting state and does not wear the seat belt, the controller 13 outputs warning signals to the notifying unit 14. The controller 13 is electrically connected to the ECU 30 and acquires the ON/OFF information on the ACC power source or the IG power source from the ECU 30. The controller 13 starts based on the ON information on the ACC power source or the IG power source and outputs waring lamp turning-on signals to the notifying unit 14. The controller 13 stops based on the OFF information on the ACC power source or the IG power source and outputs waring lamp turning-off signals to the notifying unit 14.

The notifying unit 14 warns a passenger based on warning signals output from the controller 13. The warning signals include the waring lamp turning-on signals, the waring lamp turning-off signals, and waning lamp blinking signals, for example. The notifying unit 14 is a warning lamp that outputs light having directivity as warning light, for example, and includes a plurality of light emitting diodes (LEDs). The warning light is simple light that makes an appeal to at least the eyes of a passenger and is red light, for example. The notifying unit 14 is disposed such that its optical axes extend to the eye points of passengers on the respective seats 2a.

The detectors 20 can transmit and receive radio signals to and from the reader 10. The detectors 20 each include no battery and are driven by the radio signals for supplying electric power included in the transmission signals transmitted from the reader 10. The detectors 20 are communication devices using what is called passive RFID. As illustrated in FIGS. 1 to 3, the detectors 20 include a plurality of first detectors 20A and a plurality of second detectors 20B.

The first detector 20A is what is called a sitting sensor provided in the seat surface 2aa and the backrest 2ab of the seat 2a and detects sitting of a passenger on the seat 2a. When receiving the transmission signals from the reader 10, the first detector 20A can transmit first response signals output in response to the transmission signals to the reader 10. The first response signals are radio signals transmitted from the first detectors 20A. The first detector 20A according to the present embodiment is disposed in the sitting area D on the seat 2a where the first response signals transmitted to the reader 10 are blocked by sitting of a passenger on the seat 2a. At least one first detector 20A (four in the present embodiment) according to the present embodiment is disposed in each of the sitting areas D of the seat surface 2aa and the backrest 2ab. The first detectors 20A are disposed under the surfaces of the seat surface 2aa and the backrest 2ab. A plurality of first detectors 20A are disposed with at least part thereof separated with respect to the seat surface 2aa and with at least part thereof separated with respect to the backrest 2ab in the height direction. As illustrated in FIG. 3, in the seat surface 2aa, for example, two first detectors 20A according to the present embodiment are disposed on each of the diagonal lines of the substantially rectangular sitting area D the two sides of which extend along the depth direction and the width direction. In the backrest 2ab, for example, two first detectors 20A are disposed on each of the diagonal lines of the substantially rectangular sitting area D the two sides of which extend along the up-and-down direction and the width direction. As illustrated in FIG. 1, the first detectors 20A each include a second antenna 21A and a detecting unit 23A.

The second antenna 21A transmits and receives radio signals (radio waves) by a radio-wave system using high-frequency waves, such as the UHF band and microwaves. The second antenna 21A is electrically connected to the detecting unit 23A and receives the transmission signals from the reader 10. The second antenna 21A outputs the received radio signals to the detecting unit 23A. The second antenna 21A transmits the first response signals output from the detecting unit 23A to the reader 10.

The detecting unit 23A is a circuit that outputs the first response signals. The detecting unit 23A is provided as an integrated circuit (IC), for example. The detecting unit 23A is driven by the radio signals for supplying electric power received by the second antenna 21A and outputs the first response signals to the second antenna 21A. The detecting unit 23A includes a radio frequency (RF) circuit 23a, a CPU 23b, and a memory 23c. The RF circuit 23a demodulates the radio signals received by the second antenna 21A and modulates the first response signals to be transmitted by the second antenna 21A, for example. The CPU 23b outputs the first response signals based on first identification information stored in the memory 23c to the second antenna 21A. The memory 23c stores therein the first identification information. The first identification information is unique ID allocated to the corresponding first detector 20A out of the identification information described above.

The second detector 20B is what is called a buckle sensor provided to the buckle 25 of the seat 2a and detects a seat belt wearing state. When receiving the transmission signals from the reader 10, the second detector 20B can transmit second response signals output in response to the transmission signals to the reader 10 depending on the seat belt wearing state. The second response signals are radio signals transmitted from the second detectors 20B. If the seat belt is worn, the second detector 20B according to the present embodiment can transmit the second response signals. As illustrated in FIG. 1, the second detectors 20B each include a second antenna 21B, a switching circuit 22, and a detecting unit 23B.

The second antenna 21B transmits and receives radio signals by a radio-wave system using high-frequency waves, such as the UHF band and microwaves. The second antenna 21B is electrically connected to the switching circuit 22 and receives the transmission signals from the reader 10. The second antenna 21B outputs the received radio signals to the detecting unit 23B via the switching circuit 22 in an ON state. The second antenna 21B transmits the second response signals output from the detecting unit 23B via the switching circuit 22 in the ON state to the reader 10.

Figure 6:
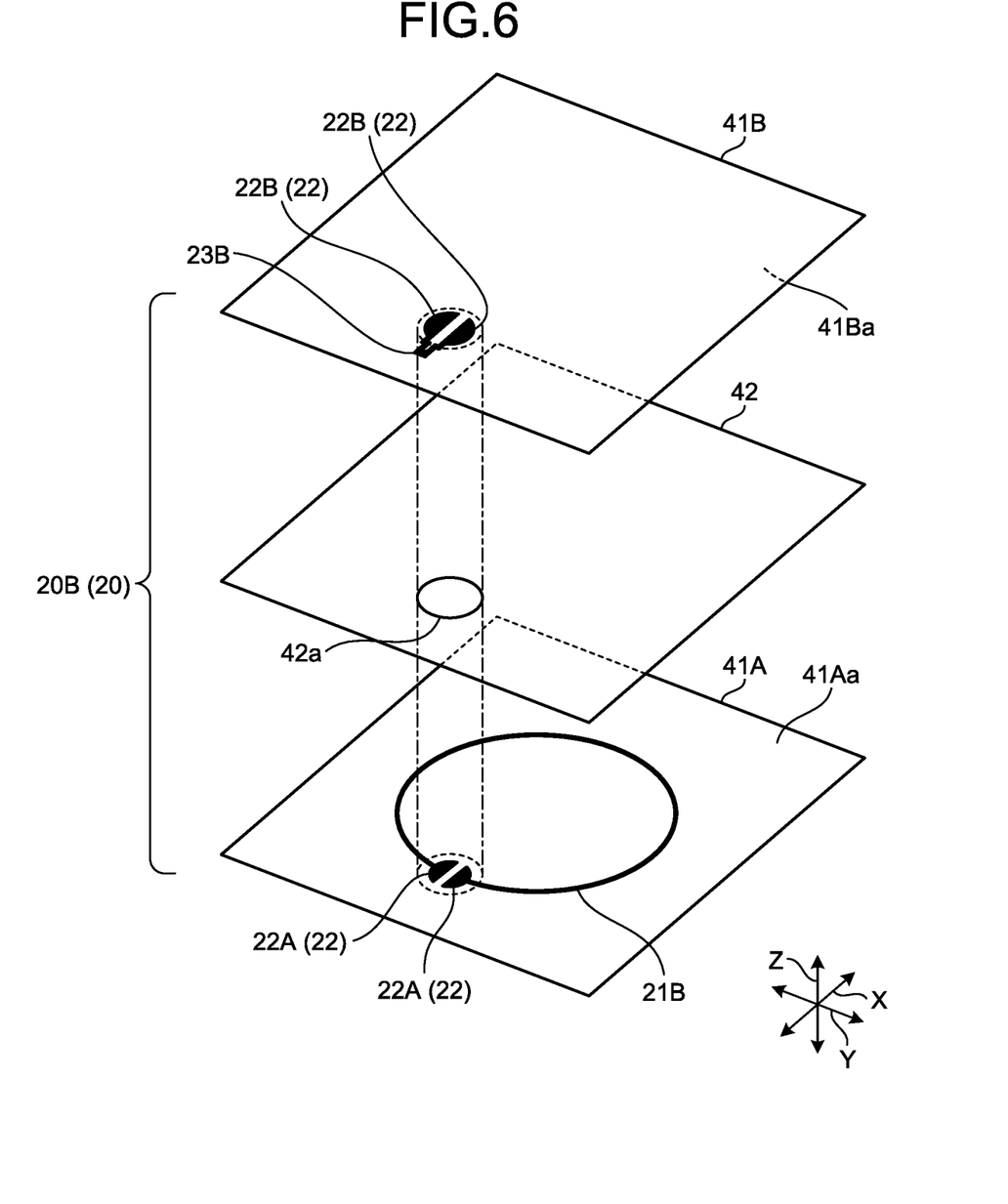
FIG. 6 is an exploded view of an exemplary configuration of a second detector in the embodiment.
Figure 9:
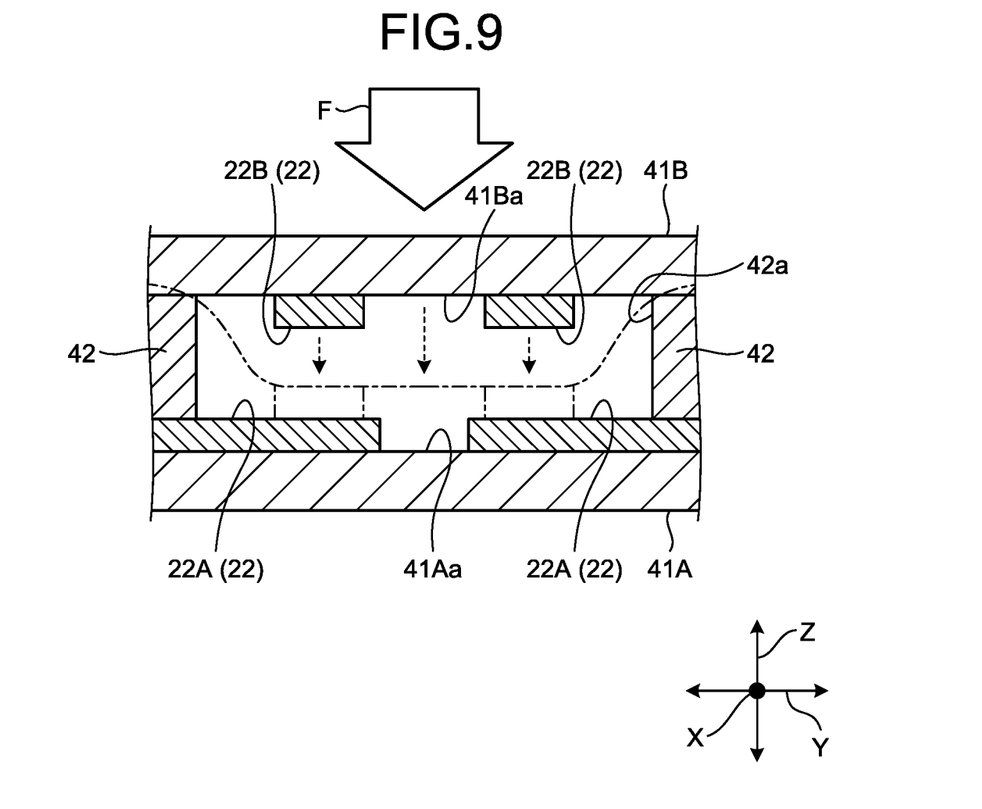
FIG. 9 is a partial sectional view of an example of a change in the state of the second detector in the embodiment.

The switching circuit 22 is provided between the second antenna 21B and the detecting unit 23B and switches an electrical contact between the second antenna 21B and the detecting unit 23B to a contact state or a non-contact state depending on the sitting state of a passenger on the seat 2a. As illustrated in FIG. 6, the switching circuit 22 includes a pair of first contacts 22A and a pair of second contacts 22B, for example. The pair of first contacts 22A is electrically connected to the second antenna 21B. The pair of second contacts 22B is electrically connected to the detecting unit 23B. The switching circuit 22 switches to the contact state in which the first contacts 22A come into contact with the second contacts 22B or the non-contact state in which the first contacts 22A do not come into contact with the second contacts 22B depending on the sitting state on the seat 2a. As illustrated in FIG. 9, if external force F due to sitting of a passenger is applied, for example, the switching circuit 22 makes the first contacts 22A and the second contacts 22B into the contact state, that is, an electrically connected state (ON state). At this time, the detecting unit 23B detects a change in resistance between the first contacts 22A and the second contacts 22B (or an electric current flowing between the first contacts 22A and the second contacts 22B), thereby detecting the ON state of the switching circuit 22. By contrast, if the external force F due to sitting of a passenger is not applied, the switching circuit 22 makes the first contacts 22A and the second contacts 22B into the non-contact state, that is, an electrically non-connected state (OFF state). As described above, if a passenger sits on the seat 2a, the switching circuit 22 switches to the ON state by the pressing force applied by the passenger to the seat surface 2aa. If no passenger sits on the seat 2a, the switching circuit 22 is released from the pressing force applied by a passenger and switches to the OFF state.

The detecting unit 23B is a circuit that outputs the second response signals. The detecting unit 23B is provided as an IC, for example. The detecting unit 23B is driven by the radio signals for supplying electric power received by the second antenna 21B and outputs the second response signals to the second antenna 21B. The detecting unit 23B includes the RF circuit 23a, the CPU 23b, and the memory 23c. The RF circuit 23a demodulates the radio signals received by the second antenna 21B and modulates the second response signals to be transmitted by the second antenna 21B, for example. The CPU 23b outputs the second response signals based on second identification information stored in the memory 23c to the second antenna 21B. The memory 23c stores therein the second identification information. The second identification information is different from the first identification information and is unique ID allocated to the corresponding second detector 20B out of the identification information described above. The detecting unit 23 monitors resistance in the switching circuit 22 (or an electric current flowing through the switching circuit 22) and determines the ON/OFF state of the switching circuit 22 based on a change in the resistance (change in the electric current).

If the switching circuit 22 is in the ON state, the detecting unit 23B outputs the second response signals to the second antenna 21B.

Figure 11:
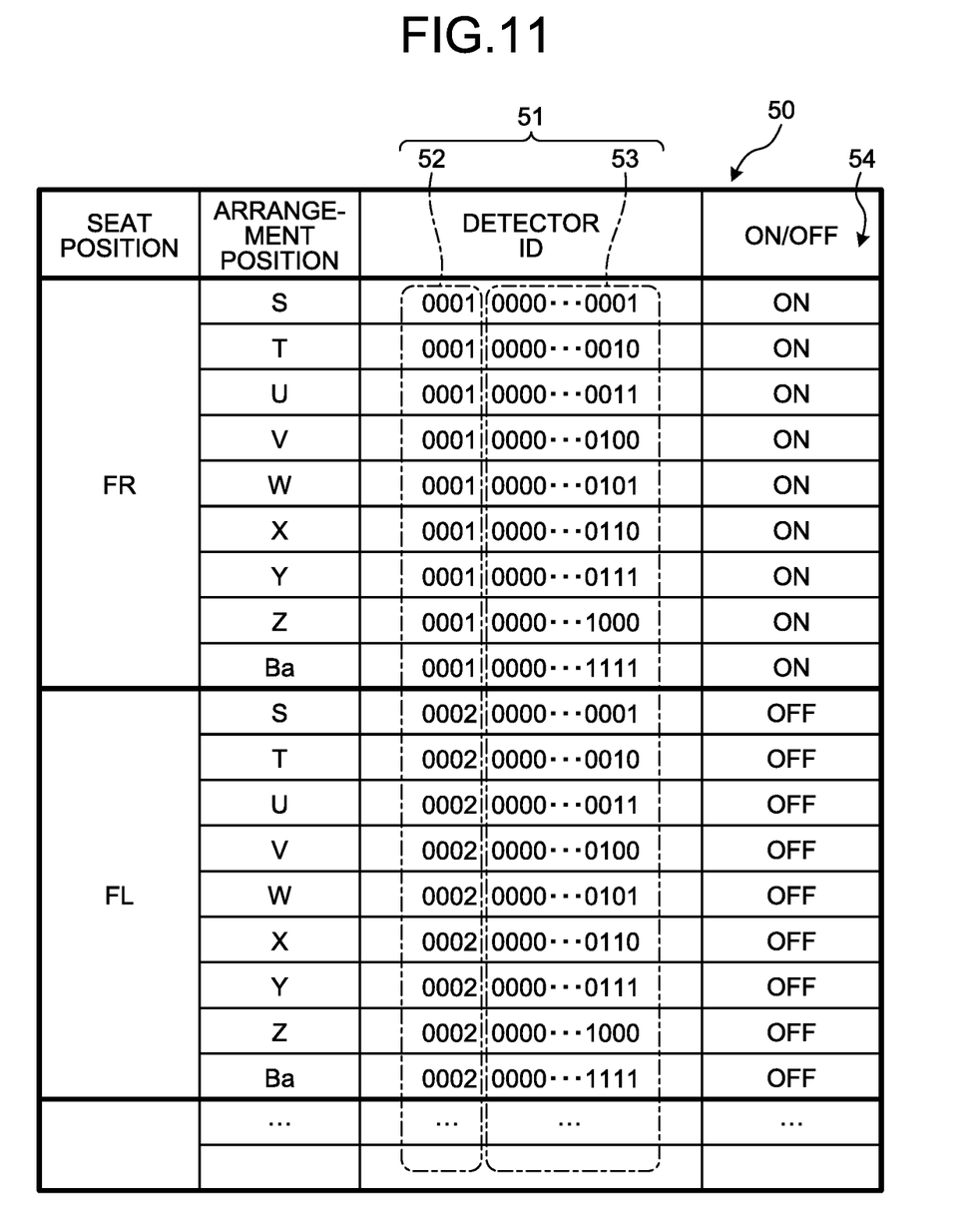
FIG. 11 is a diagram of an example of an ID management table of the detection system for vehicle according to the embodiment.

The controller 13 according to the present embodiment determines the sitting state on each of the seats 2a based on whether the first response signals are received from the first detectors 20A in response to the transmission signals. Specifically, if the controller 13 does not receive the first response signals output in response to the transmission signals, the controller 13 determines that the first response signals transmitted from the first detectors 20A to the reader 10 are blocked by sitting of a passenger and that the passenger sits on the corresponding seat 2a. By contrast, if the controller 13 receives the first response signals, the controller 13 refers to an ID management table 50 illustrated in FIG. 11. The controller 13 identifies a seat position and arrangement positions at which the respective first detectors 20A are disposed based on the first identification information included in the first response signals and determines the sitting state of a passenger based on the number of arrangement positions. If the controller 13 receives four first response signals, for example, the controller 13 identifies a seat position (MR) and arrangement positions (W, X, Y, and Z) based on the received four pieces of first identification information (detector IDs) and determines the sitting state of a passenger based on the four arrangement positions. In this case, it is assumed that a rectangular bag placed along the seat surface 2aa, for example, is blocking the first response signals from the four first detectors 20A disposed at the arrangement positions W, X, Y, and Z. As a result, the controller 13 determines that no passenger is in the sitting state. As illustrated in FIG. 11, the first identification information according to the present embodiment includes a seat position 52 and an arrangement position 53 at which the first detector 20A is disposed. The seat position 52 is information indicating a seat position in the cabin 2b and expressed by a four-digit character string, for example. Specifically, in the seat position 52, "0001" corresponds to FR (driver's seat) as illustrated in FIGS. 2 and 11. Similarly, "0002" corresponds to FL (passenger's seat), "0003" corresponds to MR (middle right seat), "0004" corresponds to ML (middle left seat), "0005" corresponds to RR (rear right seat), "0006" corresponds to RM (rear middle seat), and "0007" corresponds to RL (rear left seat). The arrangement position 53 is information indicating an arrangement position on the seat 2a and expressed by a character string the number of digits of which can be changed depending on the number of mounted first detectors 20A or the number of disposed first detectors 20A. The arrangement position 53 according to the present embodiment is expressed by a 12-digit character string, for example. Specifically, in the arrangement position 53, "0000 . . . 0001" corresponds to an arrangement position S as illustrated in FIGS. 3 and 11. Similarly, "0000 . . . 0010" corresponds to an arrangement position T, "0000 . . . 0011" corresponds to an arrangement position U, "0000 . . . 0100" corresponds to an arrangement position V, "0000 . . . 0101" corresponds to an arrangement position W, "0000 . . . 0110" corresponds to an arrangement position X, "0000 . . . 0111" corresponds to an arrangement position Y, and "0000 . . . 1000" corresponds to an arrangement position Z. ON/OFF 54 is information indicating ON/OFF of the first detector 20A corresponding to a detector ID 51. Specifically, the ON/OFF 54 indicates whether the first response signals are received from the corresponding first detector 20A. In the ON/OFF 54, "ON" indicates "received", and "OFF" indicates "not received".

The controller 13 can determine the attributes of a passenger sitting on the seat 2a based on at least one piece of identification information received from the four first detectors 20A in the seat surface 2aa and on at least one piece of identification information received from the four first detectors 20A in the backrest 2ab. Examples of the attributes of a passenger include, but are not limited to, a person, an object, etc. In the case of a person, the attributes include an adult and a child. If the controller 13 receives the first identification information from the first detectors 20A disposed at the four arrangement positions S, T, U, and V in the seat surface 2aa, for example, the controller 13 determines that the passenger sitting on the seat 2a is a child based on the identification information received from the first detectors 20A disposed at the arrangement positions W and X in the height direction of the backrest 2ab.

The controller 13 determines the seat belt wearing state of each of the seats 2a based on whether the second response signals are received from the second detector 20B in response to the transmission signals. Specifically, if the controller 13 receives no second response signal output in response to the transmission signals, the controller 13 determines that the seat belt of the corresponding seat 2a is not worn. By contrast, if the controller 13 receives the second response signals, the controller 13 refers to the ID management table 50 illustrated in FIG. 11. The controller 13 identifies the seat position at which the second detector 20B is disposed based on the second identification information included in the second response signals and determines the seat belt wearing state. The controller 13, for example, identifies the seat position (MR) based on the received second identification information (detector ID) and determines that the seat belt of the seat 2a corresponding to the seat position is worn. Similarly to the first identification information, the second identification information according to the present embodiment includes the seat position 52 and the arrangement position 53 at which the second detector 20B is disposed. In the arrangement position 53, the second detector 20B is provided to the buckle 25, and "0000 . . . 1111" corresponds to an arrangement position Ba of the buckle 25. The ON/OFF 54 is information indicating ON/OFF of the second detector 20B corresponding to the detector ID 51. Specifically, the ON/OFF 54 indicates whether the second response signals are received from the corresponding second detector 20B. In the ON/OFF 54, "ON" indicates "received", and "OFF" indicates "not received". The controller 13 determines the sitting state of a passenger on the seat 2a based on the first response signals and determines the seat belt wearing state based on the second response signals. If a passenger is in the sitting state and does not wear the seat belt, the controller 13 outputs warning signals to the notifying unit 14.

Figure 4:
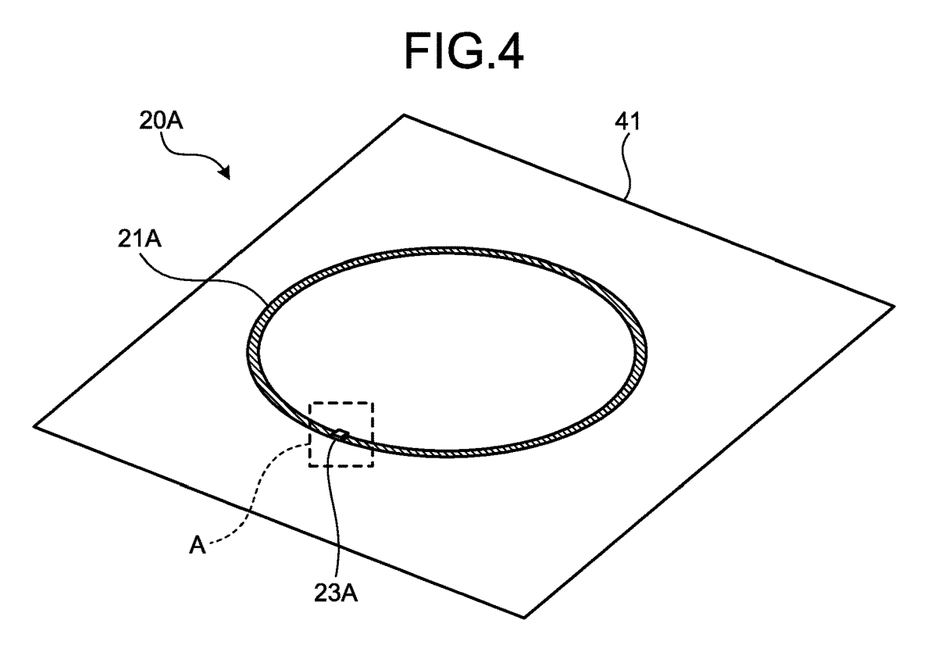
FIG. 4 is a schematic of an exemplary configuration of a first detector in the embodiment.
Figure 5:
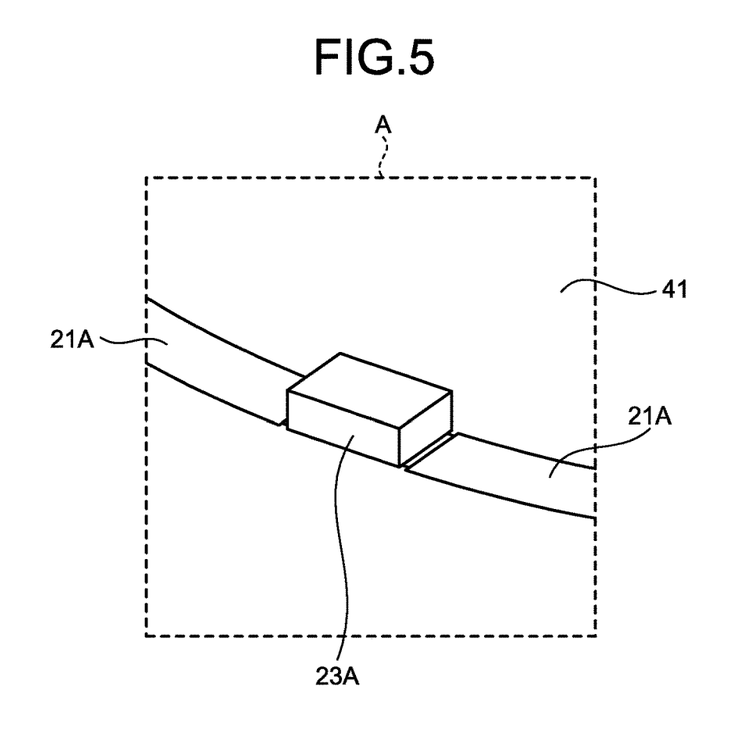
FIG. 5 is a partial enlarged view of the exemplary configuration of the first detector in the embodiment.

The following describes the structure of the first detector 20A with reference to FIGS. 4 and 5.

As illustrated in FIGS. 4 and 5, the first detector 20A includes a flexible sheet 41. The flexible sheet 41 is an electrical insulating and flexible film member and made of a resin material, such as a polyester film. The flexible sheet 41 is provided with the second antenna 21A and the detecting unit 23A on the surface. The second antenna 21A is a conductive pattern wound in a ring shape (loop shape) on the surface of the flexible sheet 41. The detecting unit 23A is disposed between the leading end at the start of winding of the conductive pattern and the trailing end at the end thereof.

Figure 7:
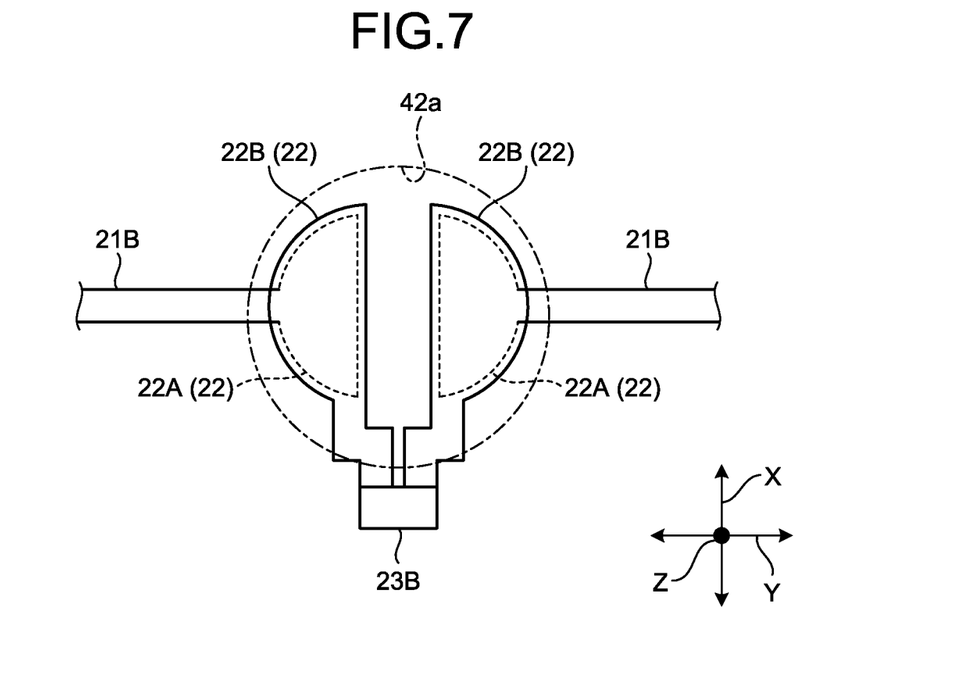
FIG. 7 is a partial enlarged view of the exemplary configuration of the second detector in the embodiment.
Figure 8:
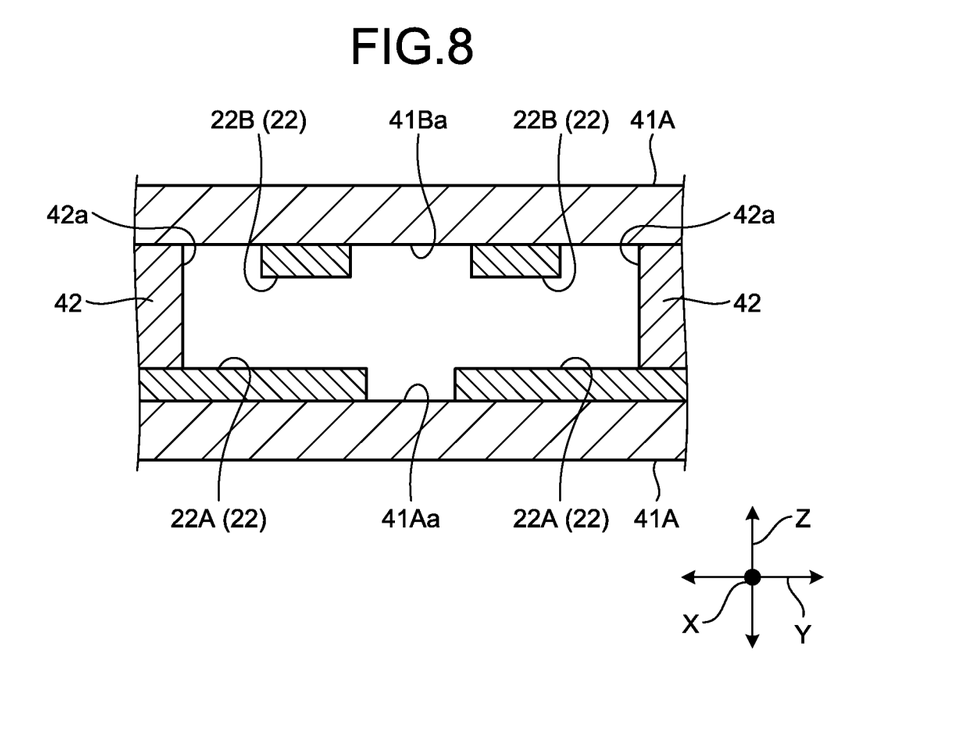
FIG. 8 is a partial sectional view of the exemplary configuration of the second detector in the embodiment.

The following describes the structure of the second detector 20B with reference to FIGS. 6 to 8.

As illustrated in FIG. 6, the second detector 20B includes a first flexible sheet 41A, a second flexible sheet 41B, and an insulating sheet 42. The second flexible sheet 41B is disposed facing the first flexible sheet 41A. The insulating sheet 42 is interposed between the first flexible sheet 41A and the second flexible sheet 41B. The second detector 20B has a multilayered structure in which the first flexible sheet 41A, the insulating sheet 42, and the second flexible sheet 41B are laminated in this order in the up-and-down direction (Z-direction). The first flexible sheet and the second flexible sheet are electrical insulating and flexible film members and made of a resin material, such as a polyester film.

The first flexible sheet 41A includes the second antenna 21B and the pair of first contacts 22A. The first flexible sheet 41A according to the present embodiment is provided with a conductive pattern including the second antenna 21B and the pair of first contacts 22A on the surface. The conductive pattern is made of a conductive material, such as silver paste, and formed by screen printing, for example. As illustrated in FIG. 6, the second antenna 21B and the first contacts 22A are formed on a first facing surface 41Aa facing the second flexible sheet 41B. The second antenna 21B is a conductive pattern wound in a ring shape (loop shape). In the second antenna 21B, the first contacts 22A are formed at the leading end at the start of winding of the conductive pattern and the trailing end at the end thereof. The second antenna 21B preferably has an optimum antenna length as an antenna and more preferably has an antenna length of 326 mm, for example. As illustrated in FIG. 7, the first contacts 22A each have a semicircular shape with its chord extending in the depth direction (X-direction). The first contacts 22A serving as a pair are disposed with a certain insulating gap interposed therebetween in the width direction (Y-direction). As illustrated in FIG. 8, the first contacts 22A serving as a pair preferably have the same and uniform thickness in the up-and-down direction (Z-direction) to suppress contact failures between the first contacts 22A and the second contacts 22B, for example.

The second flexible sheet 41B includes the detecting unit 23B and the pair of second contacts 22B. The detecting unit 23B and the second contacts 22B are formed on a second facing surface 41Ba facing the first flexible sheet 41A. The detecting unit 23B is provided as an IC chip, for example, and mounted on the second flexible sheet 41B. The second contacts 22B are formed on the surface of the second flexible sheet 41B as a conductive pattern. The second contacts 22B have substantially the same size and the same shape as those of the first contacts 22A.

The insulating sheet 42 is an electrical insulating and flexible film member and made of a resin material, such as a polyester film. The insulating sheet 42 has a through hole 42a penetrating from the first facing surface 41Aa to the second facing surface 41Ba at the position where the first contacts 22A and the second contacts 22B face each other. The through hole 42a is formed at the position where the first contacts 22A are exposed with the first flexible sheet 41A and the insulating sheet 42 laminated and at the position where the second contacts 22B are exposed with the second flexible sheet 41B and the insulating sheet 42 laminated. As illustrated in FIG. 7, the through hole 42a has a hole diameter sufficiently large to accommodate the switching circuit 22 including the pair of first contacts 22A and the pair of second contacts 22B. The thickness of the insulating sheet 42 in the up-and-down direction is preferably set such that the first contacts 22A and the second contacts 22B come into contact with each other by the external force F due to sitting of a passenger, for example.

Figure 10:
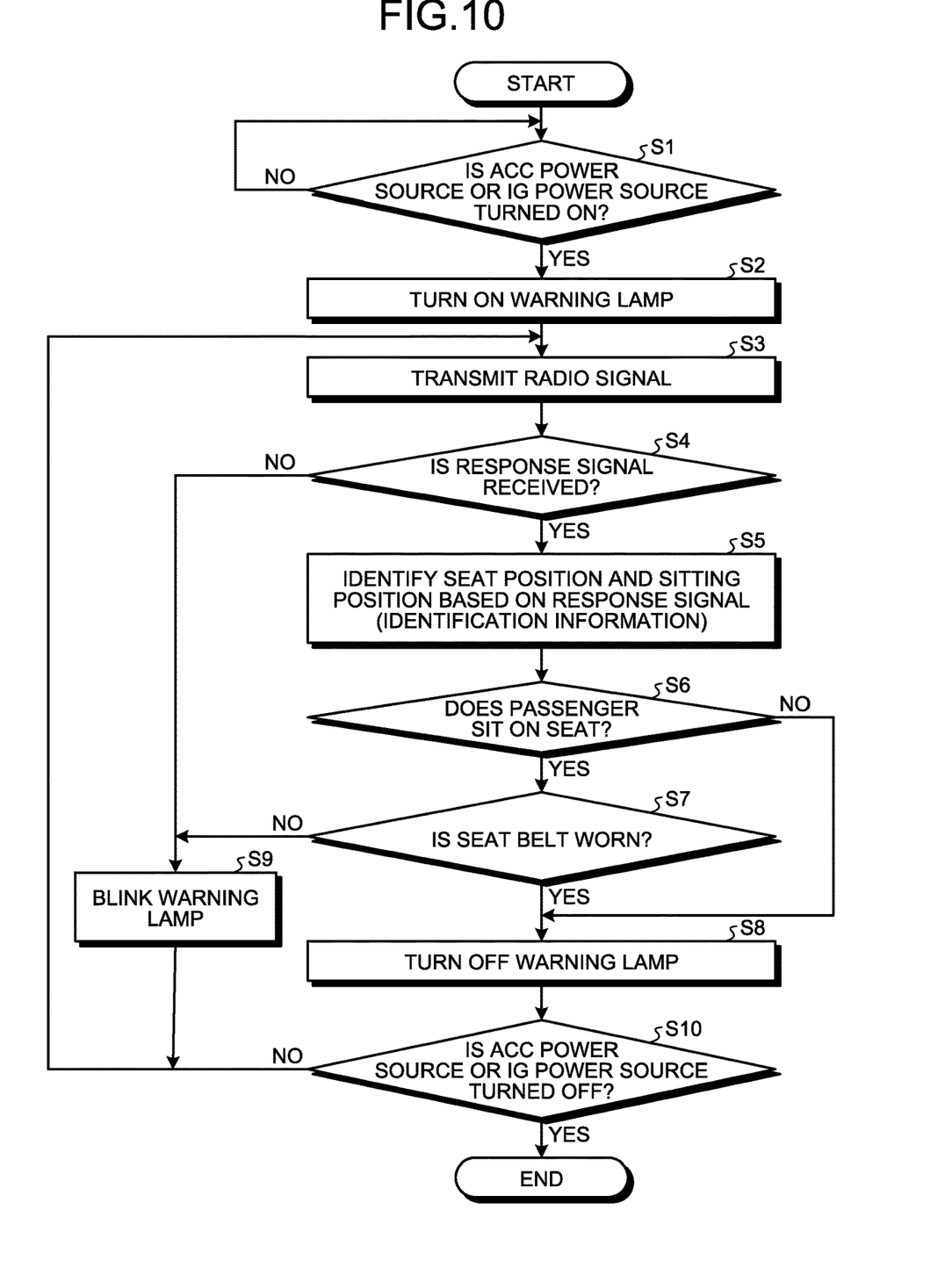
FIG. 10 is a flowchart of an exemplary operation performed by the detection system for vehicle according to the embodiment.

The following describes an exemplary operation performed by the detection system for vehicle 1 with reference to FIG. 10.

At Step S1, the reader 10 determines whether the ACC power source or the IG power source is turned ON. Specifically, the controller 13 in the reader 10 determines whether the ACC power source or the IG power source is turned ON based on the ON/OFF information on the ACC power source or the IG power source acquired from the ECU 30. If the ACC power source or the IG power source is not turned ON (No at Step S1), the reader 10 performs the processing at Step S1 again. By contrast, if the ACC power source or the IG power source is turned ON (Yes at Step S1), the reader 10 performs the processing at Step S2.

At Step S2, the reader 10 turns on the warning lamp. Specifically, the controller 13 outputs the warning lamp turning-on signals to the notifying unit 14. The notifying unit 14 turns on the warning lamp based on the received warning lamp turning-on signals. The present embodiment turns on the warning lamp in the initial state regardless of the sitting state on the seat 2a and the seat belt wearing state. If certain conditions are satisfied, the reader 10 turns off the warning lamp. If not, the reader 10 at least changes the state of the waring lamp from turned-on to blinking.

Subsequently, at Step S3, the reader 10 transmits the radio signals. Specifically, the controller 13 controls the transmitting and receiving unit 12 to transmit the transmission signals including the radio signals for supplying electric power to the detectors 20 at one-second intervals, for example. If the first detector 20A receives the transmission signals from the reader 10, the first detector 20A transmits the first response signals output in response to the transmission signals to the reader 10. If the second detector 20B receives the transmission signals from the reader 10, and the switching circuit 22 is turned ON, the second detector 20B electrically connects the detecting unit 23B and the second antenna 21B and transmits the second response signals from the detecting unit 23B to the reader 10 via the second antenna 21B. By contrast, if the switching circuit 22 is turned OFF, the second detector 20B cuts off the electrical connection between the detecting unit 23B and the second antenna 21B and transmits no second response signal to the reader 10.

Subsequently, at Step S4, the reader 10 determines whether the response signals are received in response to the transmission signals. Specifically, the controller 13 determines whether the first response signals and the second response signals are received from the first detector 20A and the second detector 20B, respectively, in response to the transmission signals. If neither the first response signals nor the second response signals are received (No at Step S4), the reader 10 performs the processing at Step S9. By contrast, one of the first response signals and the second response signals are received (Yes at Step S4), the reader 10 performs the processing at Step S5.

At Step S5, the reader 10 identifies the seat position and a sitting position based on the response signals. Specifically, the controller 13 refers to the ID management table 50, for example, to identify the seat position and the arrangement position based on the first identification information included in the received first response signals and the second identification information included in the received second response signals.

Subsequently, at Step S6, the reader 10 determines whether a passenger is in the sitting state. Specifically, the controller 13 determines whether a passenger sits on the seat 2a corresponding to the seat position identified at Step S5 based on the number of arrangement positions. If the reader 10 determines that no passenger sits on the seat 2a, the reader 10 performs the processing at Step S8. By contrast, if the reader 10 determines that a passenger sits on the seat 2a, the reader 10 performs the processing at Step S7.

Subsequently, at Step S7, the reader 10 determines whether the seat belt is worn. Specifically, the controller 13 refers to the ON/OFF 54 of the second detector 20B corresponding to the seat position identified at Step S5 to determine whether the seat belt is worn. If the reader 10 determines that the seat belt is not worn (No at Step S7), the reader 10 performs the processing at Step S9. By contrast, if the reader 10 determines that the seat belt is worn (Yes at Step S7), the reader 10 performs the processing at Step S8.

At Step S8, the reader 10 turns off the warning lamp. Specifically, the controller 13 outputs the warning lamp turning-off signals to the notifying unit 14. The notifying unit 14 turns off the warning lamp based on the received warning lamp turning-off signals and then performs the processing at Step S10.

At Step S9, the reader 10 blinks the warning lamp. Specifically, the controller 13 outputs the warning lamp blinking signals to the notifying unit 14. The notifying unit 14 blinks the warning lamp based on the received warning lamp blinking signals and then performs the processing at Step S3 again.

At Step S10, the reader 10 determines whether the ACC power source or the IG power source is turned OFF. Specifically, the controller 13 determines whether the ACC power source or the IG power source is turned OFF based on the ON/OFF information on the ACC power source or the IG power source acquired from the ECU 30. If the reader 10 determines that the ACC power source or the IG power source is not turned OFF (No at Step S10), the reader 10 performs the processing at Step S3 and the processing subsequent thereto again. By contrast, if the reader 10 determines that the ACC power source or the IG power source is turned OFF (Yes at Step S5), the processing is ended.

As described above, the detection system for vehicle 1 includes the reader 10 and the first detector 20A. The reader 10 transmits the transmission signals including at least the radio signals for supplying electric power. The first detector 20A is driven by the radio signals for supplying electric power and can transmit the first response signals output in response to the transmission signals to the reader 10. The first detector 20A is disposed in the sitting area D on the seat 2a where the first response signals transmitted to the reader 10 are blocked. The reader 10 determines the sitting state of a passenger based on whether the first response signals are received in response to the transmission signals. As described above, the first detector 20A is disposed in the sitting area D on the seat 2a where the first response signals are blocked. With this configuration, if the response signals fail to reach the reader 10 because of a sitting passenger, the detection system for vehicle 1 can determine that the passenger in the sitting state. Consequently, the detection system for vehicle 1 can determine the sitting state of a passenger with higher accuracy. The first detector 20A does not require any switch turned ON/OFF by external pressure, for example. With this configuration, the first detector 20A needs not be disposed under the surfaces of the seat surface 2aa and the backrest 2ab. Consequently, the detection system for vehicle 1 has higher layout (L/O) flexibility. The first detector 20A is driven by the radio signals for supplying electric power received from the reader 10. With this configuration, the first detector 20A requires neither battery nor wiring for supplying electric power, thereby suppressing increased manufacturing cost and weight. The first detector 20A can fit the seat 2a having different shapes because it is made of a flexible sheet. Consequently, the detection system for vehicle 1 can have higher installability of the first detector 20A and detect sitting of a passenger with higher accuracy.

In the detection system for vehicle 1, at least one first detector 20A is disposed in each of the sitting areas D of the seat surface 2aa and the backrest 2ab. The first detectors 20A each have unique first identification information and transmit the first identification information to the reader 10 as the first response signals. If the reader 10 receives the first identification information from the first detector 20A disposed in the seat surface 2aa, the reader 10 determines the attributes of a passenger based on whether the first identification information is received from the first detector 20A disposed in the height direction of the backrest 2ab. With this mechanism, the detection system for vehicle 1 can readily determine whether the passenger sitting on the seat 2a is an adult or a child, for example.

The detection system for vehicle 1 identifies the arrangement positions of the first detectors 20A based on the first identification information received from the respective first detectors 20A and determines the sitting state of a passenger based on the number of arrangement positions. With this mechanism, the detection system for vehicle 1 can readily determine whether it is sitting of a passenger on the seat 2a or placement of baggage or the like. Consequently, the detection system for vehicle 1 can detect sitting of a passenger with higher accuracy.

The detection system for vehicle 1 further includes the second detector 20B driven by the radio signals for supplying electric power included in the transmission signals and detects the seat belt wearing state of the seat 2a. The second detector 20B includes the switching circuit 22 that switches to the ON state or the OFF state based on the seat belt wearing state of the seat 2a. The second detector 20B transmits the second response signals to the reader 10 depending on the ON state or the OFF state of the switching circuit 22. The reader 10 determines the sitting state of a passenger on the seat 2a based on the first response signals and determines the seat belt wearing state based on the second response signals. If a passenger is in the sitting state and does not wear the seat belt, the reader 10 outputs the warning signals to the notifying unit 14. The notifying unit 14 warns the passenger based on the warning signals. With this mechanism, if a passenger sitting on the seat 2a does not wear the seat belt, the detection system for vehicle 1 can urge the passenger to wear the seat belt.

While the reader 10 and the detector 20 according to the embodiment above performs radio communications by RFID, the embodiment is not limited thereto. The method simply needs to be a technique for performing near-field communications, including near-field communication (NFC), transferJet (registered trademark), and ZigBee (registered trademark), for example.

While the controller 13 according to the embodiment above is provided in the reader 10 and separated from the ECU 30, it may be integrated with the ECU 30. In other words, the operations performed by the controller 13 may be performed by the ECU.

While eight first detectors 20A according to the embodiment above are disposed at the respective arrangement positions S to Z on the seat 2a, the embodiment is not limited thereto. The positions and the number of disposed first detectors 20A are preferably determined to suppress deterioration in the detection accuracy caused by differences in the shapes of passengers, for example.

While the second detector 20B according to the embodiment above transmits the second response signals when the seat belt switches from the non-wearing state to the wearing state, the embodiment is not limited thereto. The second detector 20B may transmit the second response signals when the seat belt switches from the wearing state to the non-wearing state.

While the sitting area D according to the embodiment above has a substantially rectangular shape, the embodiment is not limited thereto. The shape of the sitting area D, for example, may be determined from the perspective of ergonomics.

The detection system for vehicle according to the present embodiments can determine a sitting state of a passenger with higher accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection system for vehicle comprising:
   a reader provided in a vehicle and configured to transmit and receive a radio signal and to transmit a transmission signal including at least a radio signal for supplying electric power;
   a first detector driven by the radio signal for supplying electric power included in the transmission signal when receiving the transmission signal and capable of transmitting a first response signal output in response to the transmission signal to the reader, and
   a second detector driven by the radio signal for supplying electric power included in the transmission signal and detects a seat belt wearing state of the seat,
   wherein
   the seat includes at least a seat surface and a backrest,
   the first detector is disposed in the seat surface or the backrest,
   the reader determines a sitting state of a passenger based on whether the first response signal is received in response to the transmission signal,
   the second detector includes a switching circuit configured to switch to an ON state or an OFF state based on the seat belt wearing state of the seat,
   the second detector transmits a second response signal to the reader by radio communications depending on the ON state or the OFF state of the switching circuit,
   the reader determines the seat belt wearing state based on the second response signal, and outputs, when the passenger is in the sitting state and does not wear the seat belt, a warning signal to a notifying unit,
   the notifying unit warns the passenger based on the warning signal,
   the second detector includes an antenna having a first end and a second end, and
   the switching circuit includes a pair of first contacts, and each of the first contacts are connected at a respective one of the first end and the second end of the antenna.

2. The detection system for vehicle according to claim 1, wherein
   a plurality of the first detectors each has unique first identification information and transmits the first identification information to the reader as the first response signal, and
   the reader determines, when receiving the first identification information from the first detector disposed in the seat surface, an attribute of the passenger based on whether the first identification information is received from the first detector disposed in a height direction of the backrest.

3. The detection system for vehicle according to claim 2, wherein
   the reader identifies arrangement positions of the first detectors based on the first identification information received from the respective first detectors and determines the sitting state of the passenger based on number of the arrangement positions.

4. The detection system for vehicle according to claim 1, wherein
   the second detector includes a flexible sheet and an insulating sheet with a through hole, the antenna is located on the flexible sheet, the antenna is disposed between the flexible sheet and the insulating sheet, and the first contacts are aligned with the through hole.

5. A detection system for vehicle comprising:
   a reader provided in a vehicle and configured to transmit and receive a radio signal and to transmit a transmission signal including at least a radio signal for supplying electric power;
   a first detector driven by the radio signal for supplying electric power included in the transmission signal when receiving the transmission signal and capable of transmitting a first response signal output in response to the transmission signal to the reader, and
   a second detector driven by the radio signal for supplying electric power included in the transmission signal and detects a seat belt wearing state of the seat, wherein
the seat includes at least a seat surface and a backrest,
the first detector is disposed in the seat surface or the backrest,
the reader determines a sitting state of a passenger based on whether the first response signal is received in response to the transmission signal,
the second detector includes a switching circuit configured to switch to an ON state or an OFF state based on the seat belt wearing state of the seat,
the second detector transmits a second response signal to the reader by radio communications depending on the ON state or the OFF state of the switching circuit,
the reader determines the seat belt wearing state based on the second response signal, and outputs, when the passenger is in the sitting state and does not wear the seat belt, a warning signal to a notifying unit,
the notifying unit warns the passenger based on the warning signal,
the switching circuit includes a first contact and a second contact, is turned to an ON state when the first contact and the second contact are in a contact state, and is turned to an OFF state when the first contact and the second contact are in a non-contact state,
the second detector includes a first flexible sheet, a second flexible sheet that is disposed facing to the first flexible sheet, and an insulating sheet that is interposed between the first flexible sheet and the second flexible sheet,
the first flexible sheet has the first contact,
the second flexible sheet has the second contact that faces the first contact, and
the insulating sheet has a through hole that is disposed between the first contact and the second contact.

* * * * *